(12) United States Patent
McCormack

(10) Patent No.: US 7,386,868 B2
(45) Date of Patent: Jun. 10, 2008

(54) EXTERNAL DESKTOP DOCK FOR A CARTRIDGE-BASED DATA STORAGE UNIT

(75) Inventor: Patrick McCormack, Costa Mesa, CA (US)

(73) Assignee: Quantum Corporation, San Jose, CA (US)

( * ) Notice: Subject to any disclaimer, the term of this patent is extended or adjusted under 35 U.S.C. 154(b) by 365 days.

(21) Appl. No.: 11/183,143

(22) Filed: Jul. 14, 2005

(65) Prior Publication Data

US 2007/0014080 A1 Jan. 18, 2007

(51) Int. Cl.
*G11B 33/02* (2006.01)

(52) U.S. Cl. ................ 720/657; 439/152; 439/157; 439/160; 361/686

(58) Field of Classification Search ........ 361/679, 361/683, 685, 94, 212, 220, 390, 391, 395, 361/399; 720/630, 636–638, 657, 639; 360/99.01, 360/99.02, 99.03, 96.51, 97.01, 99.06, 99.07; 439/67, 77, 152, 157, 160, 680, 681, 638, 439/650, 651; 358/906, 909; 369/291, 292; 235/492, 441; 292/194, 219, 203, 210, 304, 292/DIG. 11, 201, 216

See application file for complete search history.

(56) References Cited

U.S. PATENT DOCUMENTS

| | | | | |
|---|---|---|---|---|
| 4,819,114 | A | * | 4/1989 | Bernitt et al. ............... 360/133 |
| 5,065,262 | A | | 11/1991 | Blackborow et al. |
| 5,511,055 | A | * | 4/1996 | Otsuki et al. ............... 720/649 |
| D383,452 | S | * | 9/1997 | Thompson et al. ........ D14/368 |
| 6,375,484 | B1 | | 4/2002 | Shimada |
| 6,540,528 | B2 | | 4/2003 | Brodsky et al. |
| 6,545,865 | B2 | | 4/2003 | Zamora et al. |
| 6,722,895 | B1 | | 4/2004 | Brodsky et al. |
| 6,771,448 | B2 | | 8/2004 | Blair et al. |
| 6,978,903 | B2 | * | 12/2005 | Son et al. ..................... 211/26 |
| 2002/0167755 | A1 | * | 11/2002 | Staley et al. ............. 360/99.06 |
| 2003/0128454 | A1 | | 7/2003 | Basham et al. |
| 2005/0036285 | A1 | * | 2/2005 | Lee et al. .................... 361/683 |
| 2005/0060731 | A1 | * | 3/2005 | Aoyama et al. ............ 720/651 |
| 2006/0010285 | A1 | * | 1/2006 | Georgis ...................... 711/111 |

FOREIGN PATENT DOCUMENTS

EP 0 653 759 A2 5/1995

* cited by examiner

*Primary Examiner*—Lisa Lea-Edmonds
*Assistant Examiner*—Nidhi Desai
(74) *Attorney, Agent, or Firm*—Mark James Spolyar

(57) ABSTRACT

An external docking station for a removable data storage unit, allowing it to communicate with a computer system via a standard interface connection, such as a USB connector. In one implementation, the present invention provides a docking station that, in a locked or closed mode, locks a removable data storage unit into place via a latch. In one implementation, the docking station includes a motorized, geared lever assembly that simultaneously unlocks and ejects the removable data storage unit from the docking station. In one implementation, a spring biases the latch to maintain the docking station in an open position for receipt of a removable data storage unit. In one implementation, after the user presses the eject button, the present invention delays ejection of the removable data storage unit until the hard disk drive is no longer in use, thereby preventing possible damage to the drive media and/or read-write heads.

24 Claims, 7 Drawing Sheets

EXTERNAL DESKTOP DOCK FOR A CARTRIDGE-BASED DATA STORAGE UNIT

CROSS-REFERENCE TO RELATED APPLICATIONS

This application makes reference to the following commonly owned U.S. patent applications, which are incorporated herein by reference in their entirety for all purposes:

U.S. patent application Ser. No. 10/940,111 in the name of John A. Hamming, entitled "Cartridge Carrier;"

U.S. patent application Ser. No. 10/964,844 in the name of Patrick H. McCormack and John A. Hamming, entitled "Lockable Ejection System and Method;" and U.S. patent application Ser. No. 11/182,483, filed Jul. 14, 2005 in the name of Anthony E. Pione and Richard M. Andrews, entitled "Data Flow Control and Bridging Architecture Enhancing Performance of Removable Data Storage Systems."

FIELD OF THE INVENTION

The present invention relates to a data storage device that includes a hard disk drive and, more particularly, to a data storage device in which the hard disk drive is removable from a carrier dock external to a host computing system.

BACKGROUND OF THE INVENTION

As the value and use of information increases, individuals and businesses seek additional ways to process and store information. One aspect of this evolution has been a progressively growing demand for increased storage capacity in portable memory devices. With the advent of personal computers and workstations, it is often necessary to remove the medium on which digital data is stored. A user may desire to remove a storage medium to carry it to a different site and/or a different computer system. It may also be desirable to remove the storage medium to a secure location when the stored computer data is sensitive, secret, or a back-up copy is needed.

One option is the use of hard disk drives contained in removable cartridges. Indeed, removable hard disk drives are rising in popularity as a way to access frequently used information, as well as a convenient way to store back-up or sensitive information. Removable hard disk drives are typically housed in a larger shell or cartridge having isolating materials to protect the hard disk drive from dirt or other contaminates, or from a free fall onto a hard surface. Thus, a cartridge 90 (FIG. 1) may be a ruggedized container that houses a hard disk drive. The cartridge is then connected to a larger computer system or network via a carrier or installed on a desktop or server system. The carrier typically includes interface and control circuits to operably connect the hard disk drive inserted into the carrier to the motherboard of the host desktop or server system. The present invention allows the removable hard disk drive to be accessed at any computer with a standard connection, such as a USB or SATA connector. Either the original cartridge is reinserted or a different cartridge can be inserted back into the carrier or dock installed in the desktop or server. This insertion/removal cycle may occur several times throughout the work day.

As discussed above, each time the hard disk drive cartridge is inserted into the carrier, it must be electrically and logically interconnected with the host computer by way of a plurality of interfaces connectors. To that end, the carrier bridges the interface between the host computer and the removable hard disk drive. A hard disk drive typically supports a device interface and command set, such as the ATA protocol, which does not support functions directed to removable media. Therefore, one technical challenge to the implementation of removable hard disk systems is presenting an appropriate device interface to the host computer. U.S. Pat. No. 6,633,445, for example, discloses a removable disk storage system where the carrier includes the drive control circuitry, while the removable cartridge includes the disk media and read/write heads. The carrier presents an ATAPI-style interface for communication with the host computer, and converts received commands suitable for an ATA protocol interface to communicate with the hard drive control electronics.

The patent applications identified above, for example, disclose an internal docking station for ruggedized removable disk cartridges where the dock is installed in a drive bay inside the computer housing. For ease of use or other reasons, docking mechanisms where the carrier is external to the host computing system are also desirable. The use of external docking mechanisms, such as the docking mechanism illustrated in FIGS. 2A & 2B does present certain technical challenges. For example, allowing the user the ability to remove the cartridge before completion of read/write operations may cause damage to the hard disk drive housed in the cartridge.

In light of the foregoing, a need in the art exists for methods, apparatuses and systems directed to an external docking mechanism for a cartridge-based data storage unit that prevents removal of the cartridge during read/write or other operations of the hard disk drive. A need also exists in the art for an external docking mechanism that facilitates insertion and removal of the cartridge. Embodiments of the present invention substantially fulfill this need.

SUMMARY OF THE INVENTION

The present invention provides an external docking station for a removable data storage unit, allowing it to communicate with a computer system via a standard interface connection, such as a USB connector. The present invention provides a docking station that, in a locked or closed mode, locks a removable data storage unit into place via a latch. In one implementation, a spring biases the latch to maintain the docking station in an open position for receipt of a removable data storage unit. The docking station, in this implementation, includes a motorized, geared lever assembly that simultaneously unlocks and ejects the removable data storage unit from the docking station. In this implementation, after the user presses the eject button, control logic delays ejection of the removable data storage unit until the hard disk drive is no longer in use, thereby preventing possible damage to the drive media and/or read-write heads.

DESCRIPTION OF PREFERRED EMBODIMENT(S)

Figure 1:
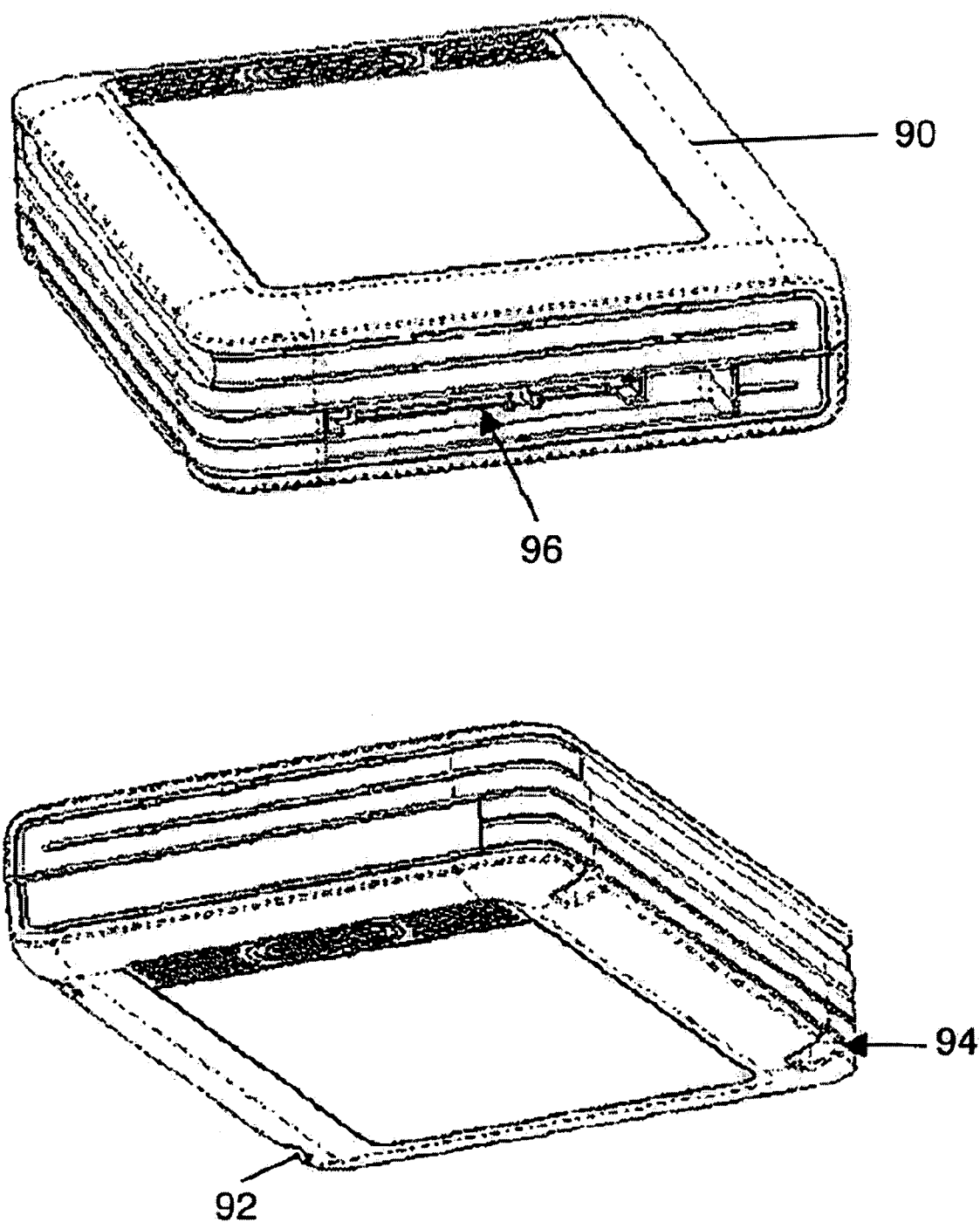
FIG. 1 illustrates an embodiment of a data storage cartridge.
Figure 2A:
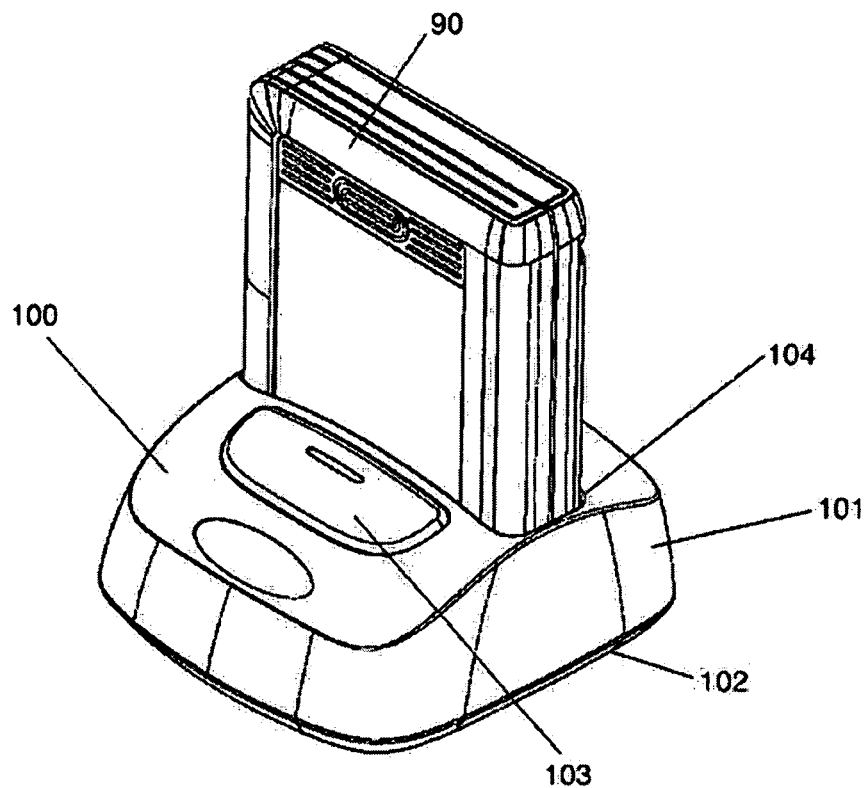
FIGS. 2A and 2B illustrate an embodiment of an external dock with a removable data storage cartridge.
Figure 2B:
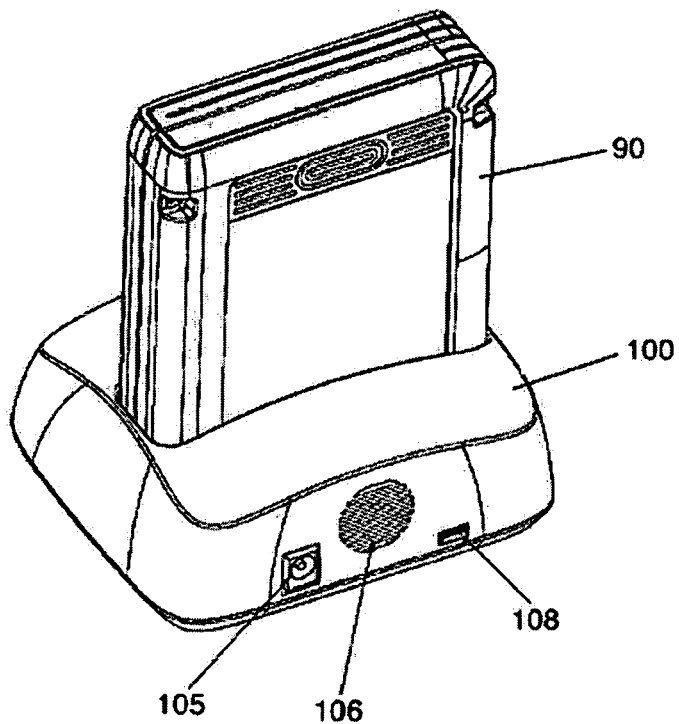

An embodiment of the present invention operates in connection with the removable cartridge system illustrated in FIGS. 1, 2A, and 2B. The present invention, however, can operate in connection with a vast array of cartridge-based, removable media systems.

FIG. 1 illustrates one embodiment of a ruggedized removable data storage cartridge 90. The cartridge 90 connects to a docking station via a SATA connector 96. The casing of the cartridge, in the illustrated embodiment, is asymmetrical to insure proper insertion of the removable data storage cartridge 90 into a docking station. The casing also includes handling notches 92 and 94.

FIGS. 2A and 2B illustrate one embodiment of an external docking station 100 with a removable data storage cartridge 90 inserted. In this embodiment, the external docking station 100 consists of a top housing 101 on top of a bottom housing 102. Internal components, including a printed circuit board assembly (PCBA), a motor, and latching/ejection mechanism are assembled on an internal sub-frame 119 (see FIG. 4A).

Figure 3:
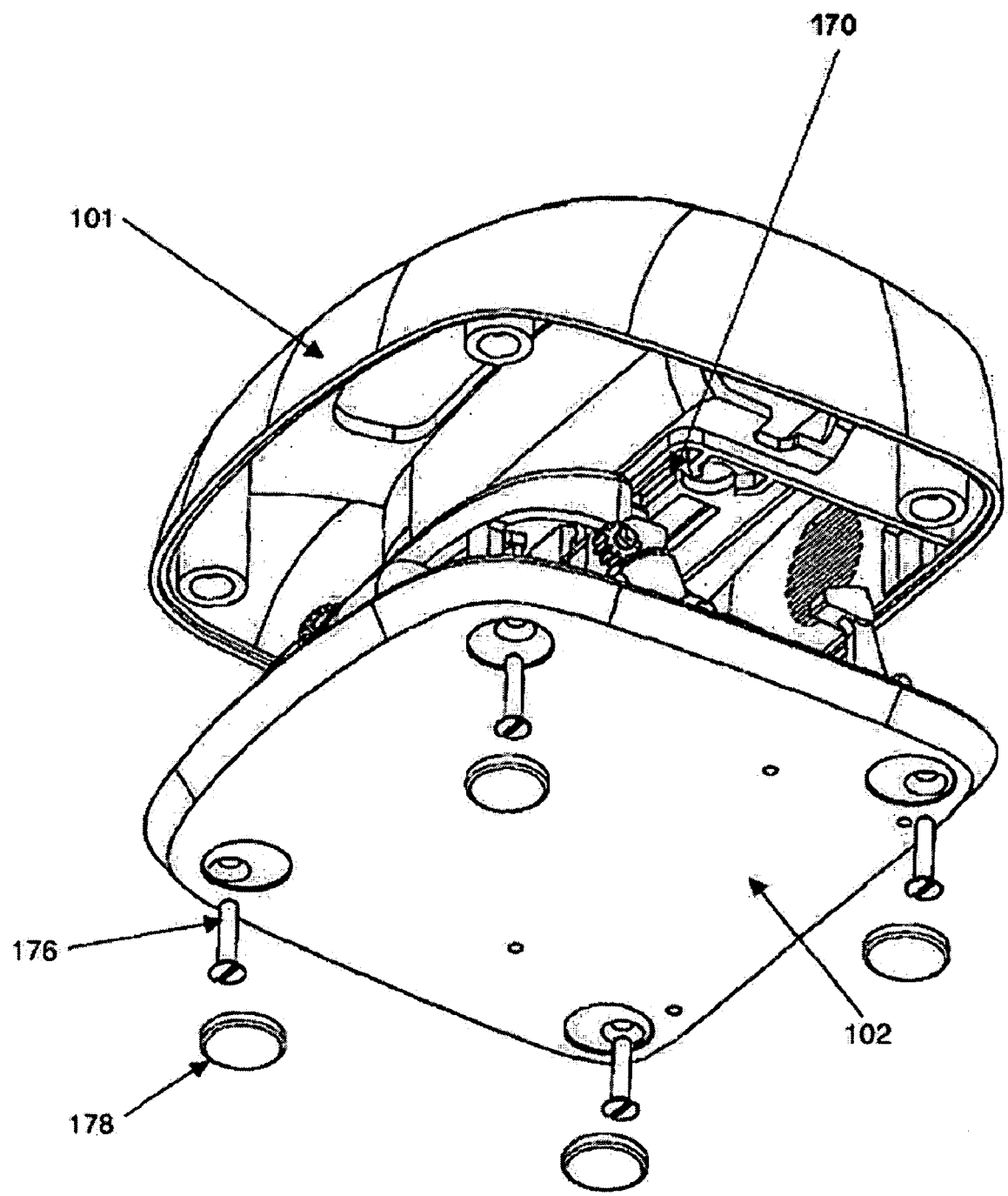
FIG. 3 illustrates the assembly of the top and bottom housings.

The top housing 101 and eject pushbutton 103 can be made of injection molded plastics. The bottom housing 102 can be made of die-cast aluminum, or any other suitable material. The sub-frame 119 and eject levers 120 and 140 can be composed of a filled and lubricated material to provide strength and reduce friction. As shown in FIG. 3, in the illustrated implementation of the invention, the top housing 101 fits onto the bottom housing 102 using four screws 176 that are covered by rubber feet 178. This assembly allows the mechanics to be tested on the bottom housing before addition of the top housing 101.

In the implementation shown in the Figures, the removable data storage cartridge 90 is inserted vertically into the external docking station 100. The external docking station 100 has a lighted eject pushbutton 103 that signals the state of the removable data storage cartridge 100, for example if the cartridge is undergoing read/write operations. The cartridge opening 104 is shaped, relative to the outer profile of cartridge 90, to allow insertion of the removable data storage cartridge 90 in one orientation only. The removable data storage disk 100 operably connects to the external docking station 100 via a SATA connector 142. However, other interface and connection types can be incorporated into the present invention. As FIG. 1B shows, the rear of the external docking station 100 has a power connector 105, a fan intake 106, and an interface connector, such as a USB connector 108, for example.

Figure 4A:
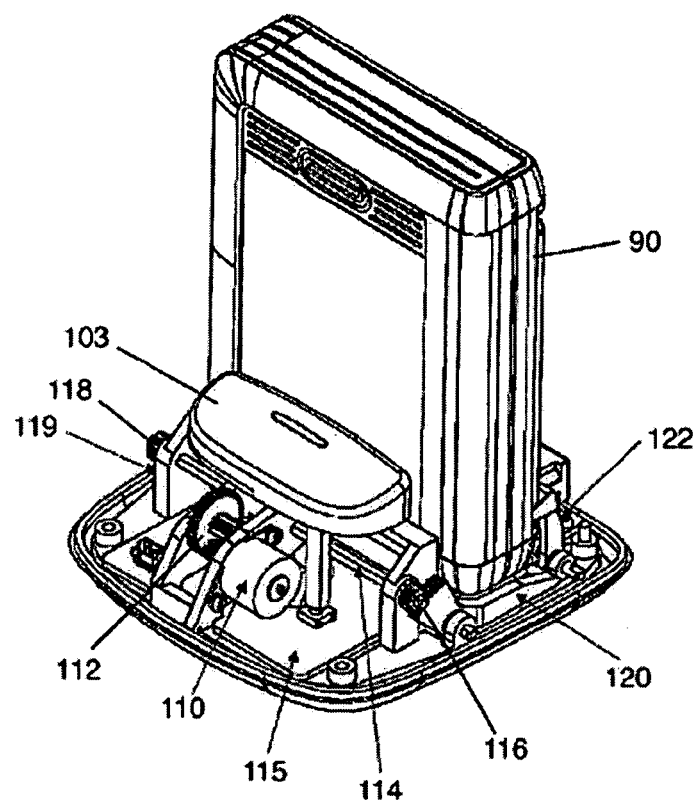
FIGS. 4A and 4B illustrate the gearing and latch system of the external dock.
Figure 4B:
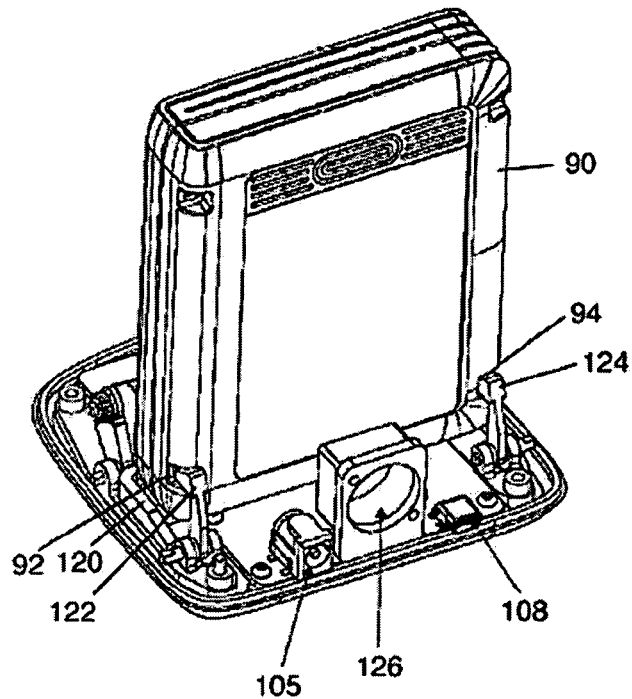

FIGS. 4A and 4B illustrate one possible implementation of the cartridge ejection and locking systems of the external docking station 100. When the external docking station 100 is in the locked position, as illustrated in FIGS. 4A and 4B, the user can press the ejection button 103. Actual ejection of the removable data storage cartridge 90, in one embodiment, is delayed by the PCBA 115 until all drive activity, such as read/write processes, have stopped, mitigating the danger of harming the removable data storage cartridge 90. The eject motor 110 engages to turn the eject gearing 112 and the eject lever drive shaft 114. The right and left eject lever drive shaft gears 116 and 118 allows a controlled movement through a certain angle, for example 14-17 degrees, raising right and left eject levers 120 and 140 and releasing the right and left latch levers 122 and 124.

The activation of the eject motor 110 causes a concerted movement whereby the right and left latches 122 and 124, biased by springs, release the removable data storage cartridge 90 by disengaging from the data storage cartridge notches 92 and 94 just before the right and left eject levers 120 and 140 push up on the removable data storage cartridge 90, disengaging it from the SATA connector 142. The user may then remove the removable data storage cartridge 90. In one implementation, the springs can be a torsion spring composed of thin gauge metal, or a spring that is integrally molded to a component of the assembly.

Figure 5A:
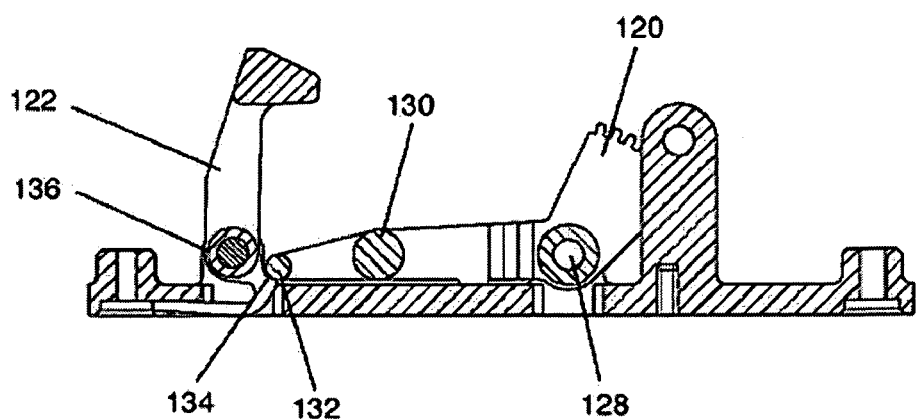
FIGS. 5A, 5B, and 5C illustrate the mechanism of the latch-lever system.
Figure 5B:
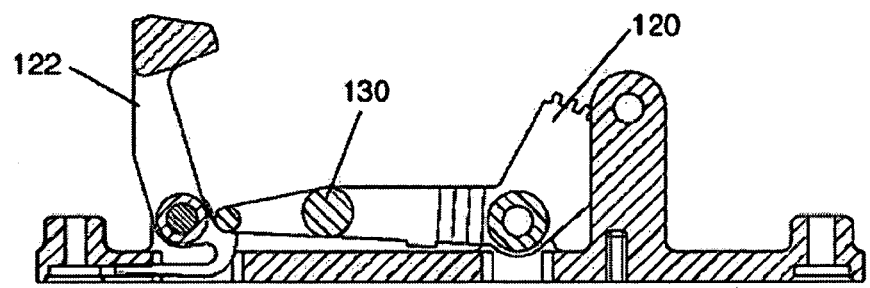
Figure 5C:
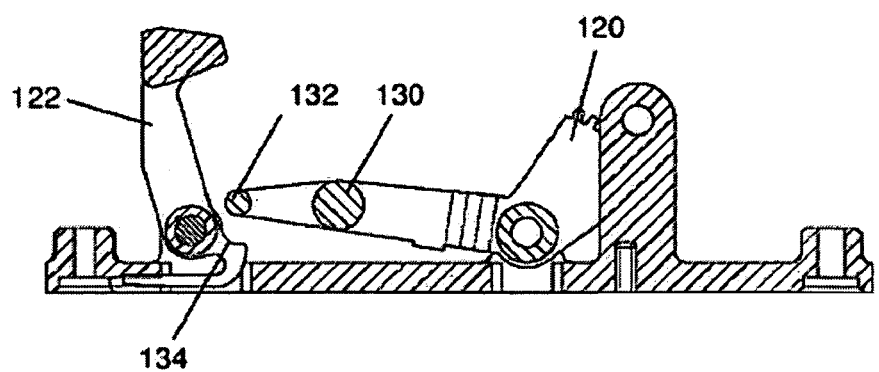

FIGS. 5A, 5B, and 5C illustrate the mechanism of the eject lever operation, according to the disclosed implementation of the present invention. Although this figure shows the only right side mechanism, the mirror-image, in one implementation, is placed on the left side, simultaneously performing the same operations. FIG. 5A shows the locked position whereby the latch 122 is inserted into the data storage cartridge notches 92 and 94, as seen in FIG. 4B. The eject lever 120 rests close to the bottom surface. Upon activation of the eject motor 110, the eject lever pivots clockwise around the eject lever pivot pin 128 causing the cartridge eject boss 130 and the latch actuation pin 132 to move upwards with the eject lever 120. The upwards movement of the latch actuation pin 132 causes the latch 122 to rotate counter clockwise around the latch pivot pin 136 through contact with the latch cam surface 134.

The position of the latch 122 and eject lever 120 after the eject boss 130 has risen part way, for example 1 mm, is shown in FIG. 5B. At this point, the latch 122 has rotated sufficiently to clear the data storage cartridge notch 92. As the eject motor 110 continues to drive the eject boss 130 to its highest position, for example 3 mm, the data storage cartridge 90 is forced upward, disconnecting the cartridge from the interface connector 96 of the external docking station and thereby completing the ejection process. The resulting open position is shown in FIG. 5C. As discussed above, a spring biases the latch lever in the open position. In the implementation shown, the cartridge is displaced a distance sufficiently to disengage the interface connector of the external docking station 100 from the mating interface connector of the cartridge 100.

When a user inserts a data storage cartridge 90, the eject boss 130 is pushed down, rotating the eject lever drive shaft gear 116 back into locked position. The downward motion of the eject lever 120 also causes the latch actuation pin 132 to press on the latch cam surface 134 rotating the latch 122 into locked position.

Figure 6:
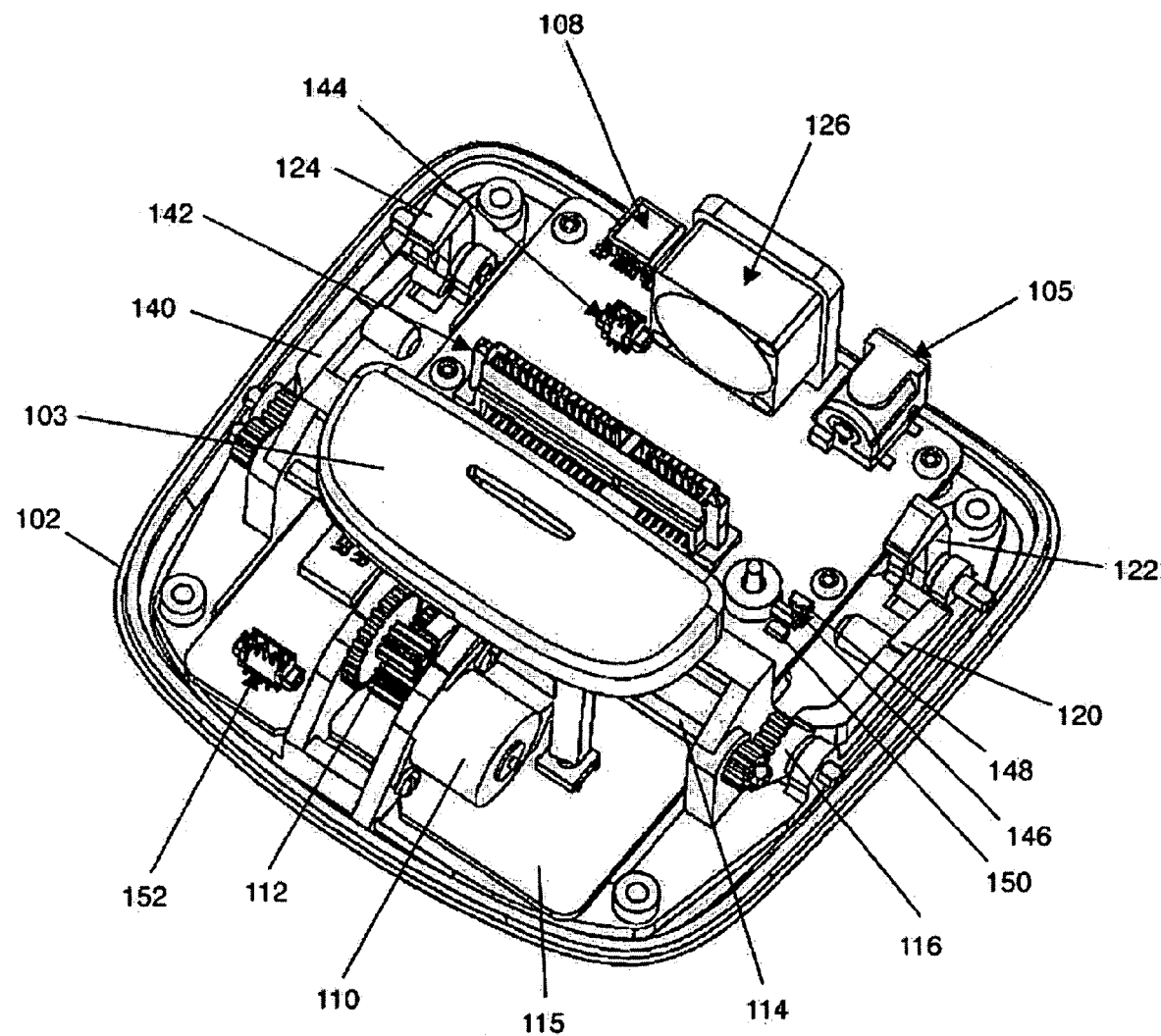
FIG. 6 illustrates the bottom housing assembly of the external dock.

FIG. 6 shows the assembly on the bottom housing 102. Components are attached to PCBA 115, which is attached to the bottom housing 102. The PCBA 115 houses the logic circuitry that actuates the eject motor 110, as well as the interface and bridging functions that logically connect the removable data storage unit in cartridge 90 to the host computing system. In one implementation, the PCBA 115 includes the data flow control and bridging functions disclosed in commonly owned and co-pending U.S. patent application Ser. No. 11/182,483. The PCBA 115 monitors the activity of the data storage cartridge by access a task file register (of the data storage unit in the cartridge 90, or a task file register in the PCBA 115) to determine the operational state of the removable data storage cartridge 90. After the user has pressed the eject pushbutton 103, the PCBA 115 delays motor activation until the removable data storage cartridge 90 is ready to be ejected, e.g. has completed all read/write operations. The PCBA 115 operably connects to the host computer through the USB connector 108, to the removable data storage cartridge 90 through the SATA connector 142, and to a power source through the power connector 105.

A fan 126 attached to the bottom housing 102 cools the electronics by intaking outside air and forcing it through openings, such as fan slots 170 (FIG. 3) located alongside the SATA connector 142, for example. The air circulated by the fan also cools the removable data storage cartridge 90 through slots on the cartridge.

The removable data storage cartridge 90 can be in a write-protection state that should block a user from writing over the present data. One implementation of the present invention includes a switch that detects this write-protection option. The detection can be accomplished by using a write-protect detection flag 146 that is pushed down when a write-protected cartridge is inserted. In this position the write-protect detection flag 146 breaks a light beam from a light emitter 148 to a light detector 150, which, in one implementation, flank the write-protect detection flag 146 and are attached to the PCBA 115. In one implementation, a pin on the write-protect detection flag 146 is disposed to contact a write-protect slidable door on the cartridge.

Figure 7A:
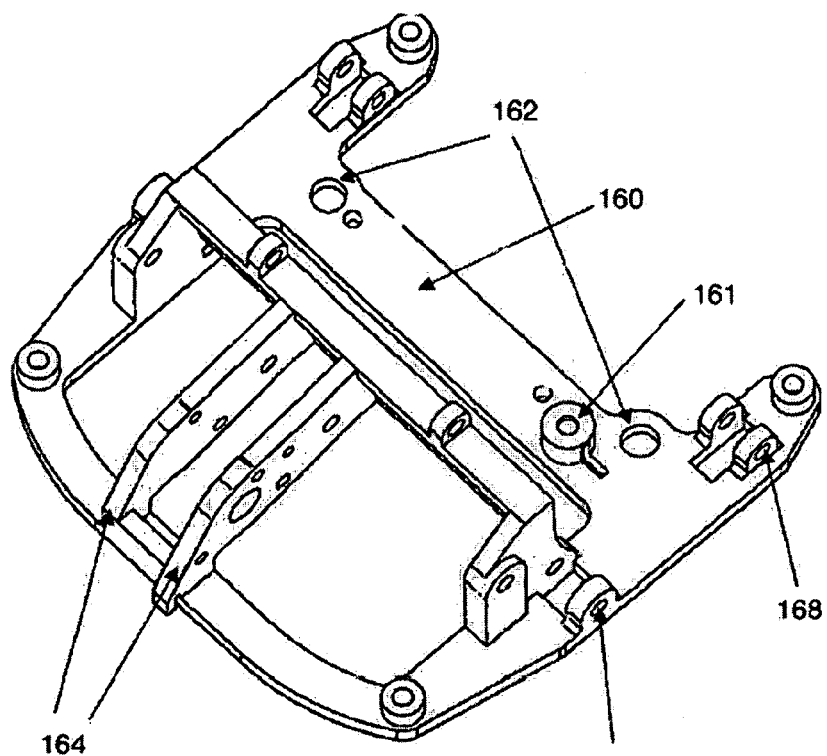
FIGS. 7A and 7B illustrate the frame of the external drive.
Figure 7B:
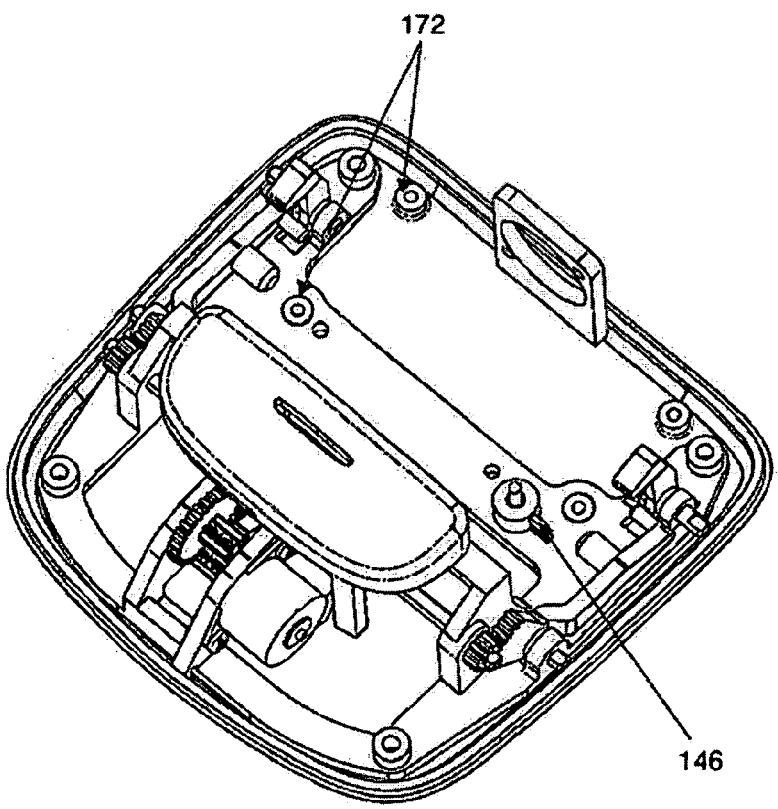

In one implementation, the components attach to a single sub-frame 119, allowing the components to be precisely positioned. One possible implementation of the frame is shown in FIGS. 7A and 7B. FIG. 7A shows the structural features to support the components described above, including motor/gearing support ribs 164 to support the eject motor 110 and eject gearing 112, eject arm pivot points 166 to support the eject lever drive shaft 114, and latch pivot points 168 to support the latch levers 122 and 124. The SATA support bar 160 passes under the PCBA 115 in the area of the SATA connector 142.

As the Figures illustrate, the frame 119 aligns to the bottom housing 102 via two locating features 162, as shown in FIG. 7A. The frame 119 plus bottom housing 102 assembly attaches to the PCBA 115 via four PCBA attachment points 172 placed near the SATA connector 142, the power connector 105 and the USB connector 108, to provide stability.

Although the present invention has been described as supporting a USB and SATA connectors, the present invention has application to data storage systems employing any suitable logical and physical connection interfaces, such as ATA, SCSI, and the like. The present invention has been described with reference to specific embodiments. Other embodiments of the present invention will be apparent to one of ordinary skill in the art. It is, therefore, intended that the claims set forth below not be limited to the embodiments described above.

What is claimed is:

1. A dock for a cartridge, comprising
a frame adapted to receive a cartridge;
first and second lateral cartridge ejection assemblies, each comprising
a latch pivotally attached to the frame and movable from an open position to a locking position, wherein the latch comprises a latch cam surface;
a spring biasing the latch to the open position;
an eject lever arm pivotally attached to the frame, wherein the eject lever arm comprises a latch actuation member, wherein the eject lever arm is pivotable from a pre-eject position to an eject position, wherein the latch actuation member is disposed to engage the latch cam surface to actuate the latch to the locking position during movement from the eject position to the pre-eject position; and
a motor assembly operably connected to respective first ends of the eject lever arms to drive the eject lever arms from the pre-eject position to the eject position.

2. The dock of claim 1 further comprising an interface connector, wherein the eject lever arms are disposed to disengage a removable cartridge from the connector during movement from the pre-eject position to the eject position.

3. The dock of claim 1 wherein the motor assembly comprises a motor, and a drive shaft operably connected to the first ends of the eject lever arms.

4. The dock of claim 1 further comprising an eject button, comprising:
a plastic button operably connected to an ejection switch;
a built-in light transmitting lens; and
an integral light pipe.

5. The dock of claim 4 wherein the integral light pipe signals the activity of the dock.

6. The dock of claim 1 further comprising a write-protect sensor, comprising:
an emitter light source;
a sensor detecting the light from the emitter;
a flag positioned between the emitter and the sensor; and
a pin on the flag disposed to contact the write-protect slidable door on the cartridge.

7. The dock of claim 1 wherein the motor assembly and the cartridge ejection assemblies are assembled on a structural frame.

8. The dock of claim 7 wherein the structural frame comprises
support ribs disposed to support the motor;
an eject arm pivot point disposed to support the eject arm; and
a latch pivot point disposed to support the latch.

9. The dock of claim 8 wherein the structural frame further comprises locating features disposed to contact the bottom housing.

10. The dock of claim 1 further comprising a housing assembly, comprising:
a bottom housing attached to the frame; and
a top housing attached to the bottom housing.

11. The dock of claim 1 further comprising a cartridge including first and second notches located such that when the cartridge is inserted into the dock, the latches of the cartridge ejection assemblies engage the notches to lock the cartridge in place.

12. The dock of claim 11 wherein the top housing of the dock includes an asymmetrical opening that matches the asymmetrical profile of the cartridge along a first axis.

13. The dock of claim 11 wherein the cartridge is a SATA-based removable data storage unit.

14. The dock of claim 11 wherein the SATA-based storage unit is a SATA hard disk drive.

15. The dock of claim 1 further comprising a printed circuit board assembly (PCBA) comprising:
a mating interface connector disposed to operably connect to a cartridge;
at least one integrated circuit;
a host connector disposed to operably connect to a computer;
a power connector; and
a fan disposed to circulate air past the circuit chips and into the cartridge.

16. The dock of claim 15 wherein the mating interface connector is a SATA connector.

17. The dock of claim 15 wherein the host connector is a USB connector.

18. The dock of claim 1 further comprising
 an eject actuation control, and
 a logic circuit responsive to the eject actuation control, and operative to delay actuation of the motor assembly in response to detected activity of the cartridge.

19. A lateral cartridge ejection assembly attached to a frame in a dock for a removable cartridge, comprising
 a latch pivotally attached to the frame and movable from an open position to a locking position, wherein the latch comprises a latch cam surface;
 a spring biasing the latch to the open position;
 an eject lever arm pivotally attached to the frame, wherein the eject lever arm comprises a latch actuation member, wherein the eject lever arm is pivotable from a pre-eject position to an eject position, wherein latch actuation member is disposed to engage the latch cam surface to actuate the latch to the locking position during movement from the eject position to the pre-eject position.

20. The assembly of claim 19 wherein the insertion of the cartridge pushes the eject lever arm into the pre-eject position.

21. The assembly of claim 20 wherein the movement of the eject lever from the eject position into the pre-eject position rotates the latch into the locking position.

22. The assembly of claim 19 wherein the first ends of the eject lever arms are operably connected to a motor assembly.

23. The assembly of claim 22 wherein the motor assembly comprises a motor, and a drive shaft, and wherein the first ends of the eject lever arms are operably connected to the drive shaft.

24. The assembly of claim 22 wherein the motor assembly is connected to a printed circuit board assembly (PCBA) including logic circuits operable to control the motor assembly.

* * * * *